US006339680B1

(12) United States Patent
Mauvais

(10) Patent No.: US 6,339,680 B1
(45) Date of Patent: Jan. 15, 2002

(54) SELECTABLE MULTI-LENS DISPOSABLE CAMERA

(76) Inventor: Jaquelynne Mauvais, 626 Wainee St., Lahaina, HI (US) 96761

( * ) Notice: Subject to any disclaimer, the term of this patent is extended or adjusted under 35 U.S.C. 154(b) by 0 days.

(21) Appl. No.: 09/480,775

(22) Filed: Jan. 10, 2000

(51) Int. Cl.[7] .......................... G03B 17/00; G03B 11/00
(52) U.S. Cl. .......................... 396/6; 396/74; 396/544; 352/85; 359/821
(58) Field of Search .......................... 396/6, 439, 544, 396/545, 74, 529, 530; 352/85, 142; 359/821

(56) References Cited

U.S. PATENT DOCUMENTS

| | | | | |
|---|---|---|---|---|
| 2,482,571 A | * | 9/1949 | Arnold | 396/74 |
| 2,575,536 A | * | 11/1951 | Thompson | 396/74 |
| 2,720,145 A | * | 10/1955 | Goodfellow | 396/74 |
| 2,960,013 A | * | 11/1960 | Bills | 396/74 |
| 3,006,262 A | * | 10/1961 | MacMillin | 396/74 |
| 3,017,815 A | * | 1/1962 | Keznickl | 396/74 |
| 3,185,061 A | | 5/1965 | Westphalen | |
| 3,836,934 A | | 9/1974 | Suzuki et al. | |
| 4,110,005 A | | 8/1978 | Bohm et al. | |
| 5,146,256 A | | 9/1992 | Frosig et al. | |
| 5,448,323 A | * | 9/1995 | Clark et al. | 396/74 |
| 5,751,353 A | | 5/1998 | Tanaka et al. | |
| 5,878,285 A | | 3/1999 | Wilk et al. | |
| 5,895,134 A | | 4/1999 | Freeman et al. | |
| 5,956,536 A | * | 9/1999 | Dow et al. | 396/74 |
| 6,201,933 B1 | * | 3/2001 | Hylen | 396/544 |

* cited by examiner

Primary Examiner—Alan A. Mathews
(74) Attorney, Agent, or Firm—Michael I. Kroll

(57) ABSTRACT

The present invention 10 discloses a rotatable disc 12 which is pivotally 54 mounted onto the front of a disposable camera housing 52 having a plurality of user selectable rotatable lens 16, 20, 24, 28, 32, each having a plurality of facets. Each lens also has a visual symbol 18, 22, 26, 30, 34 associated therewith for easy recognition by the user. Rotation of the disc 12 about its central pivot 54 and rotation of each lens creates numerous artistic accentuations to the photographs of the user.

7 Claims, 9 Drawing Sheets

SELECTABLE MULTI-LENS DISPOSABLE CAMERA

BACKGROUND OF THE INVENTION

1. Field of the Invention

The present invention relates generally to camera lenses and, more specifically, to a plurality of camera lenses each having a plurality of facets whereby a scene, object, or subject will be rendered on a photographic medium in an artistic manner has defined by the user of said lenses.

Further the invention provides for an additional element whereby said lenses can be mounted peripherally on a disc which can be rotatably mounted on a camera body providing the user with means for selectively positioning a lens element in the image optical path and effecting a photographic image of the subject in an artistic manner as defined by the user of said camera.

A further additional element is provided in the form of a disposable camera having the lens selector dial mounted thereon providing said camera with means for selectively rendering a scene, object or subject in an artistic manner as defined by the user of the disposable camera. The disposable camera has a light-tight housing having a photographic medium contained therein for recording a scene, object or subject through a user controlled aperture having a fixed focal lens and having a selected lens element of the selectively rotatable disc lens selector member positioned therein.

The selectively rotatable disc lens selector member having a plurality of special lens arrayed on the disc member can be individually positioned in the image optical path to effect the film frame image in a predetermined predictable manner according to the lens element selected.

2. Description of the Prior Art

There are other Multi-lens camera devices designed for effecting the filmed image. Typical of these is U.S. Pat. No. 3,185,061 issued to Westphalen on May 25, 1965.

Another patent was issued to Suzuki et al. on Sep. 17, 1974 as U.S. Pat. No. 3,836,934. Yet another U.S. Pat. No. 4,110,005 was issued to Bohm, et al. on Aug. 29, 1978 and still yet another was issued on Sep. 8, 1992 to Frosig, et al. as U.S. Pat. No. 5,146,256.

Another patent was issued to Tanaka, et al. on May 12, 1998 as U.S. Pat. No. 5,751,353. Yet another U.S. Pat. No. 5,878,285 was issued to Wilk, et al. on Mar. 2, 1999. Another was issued to Freeman, et al. on Apr. 20, 1999 as U.S. Pat. No. 5,895,134.

U.S. Pat. No. 3,185,061

Inventor: Leonard F. Westphalen

Issued: May 25, 1965

This United States Patent discloses a multifocal camera having an objective of normal focus with means by which its effective focal length can be increased at the convenience of the photographer to permit his taking close up pictures of a distant object, said means to be built into the camera or to comprise an attachment therefor. Further to provide means and method of modifying a camera having an objective of normal focus for distant objects so as to provide therefor a number of different equivalent focal lengths while maintaining the camera construction simple and its optical system compact and of minimum length. In addition to provide a camera and/or attachment therefor having a fast lens or objective of normal focus with means in the form of an additional lens or lenses which may be optionally combined with the objective to increase its focal length at the election and convenience of the photographer and which will also permit the objective to be used at its normal focus.

U.S. Pat. No. 3,836,934

Inventor: Shogo Suzuki, et al.

Issued: Sep. 17, 1974

A finder parallax correction lens capable of giving a visual indication, a supplementary lens and a glass protector for the main taking lens are aligned in a planar arrangement and movably built in the camera When the supplementary lens for photographing subjects at near or close distances is placed in front of the main taking lens with its optical axis in alignment with that of the taking lens, the correction lens is set in position for the finder optical system, visually indicating that it is so positioned, with the glass protector brought to its retracted position. A lock mechanism is further provided which permits the shutter to be tripped only when the lenses and glass protector are set in correct photographing positions respectively and which otherwise locks the shutter against tripping.

U.S. Pat. No. 4,110,005

Inventor: Kurt Böhm, et al.

Issued: Aug. 29, 1978

A varifocal object selectively focusable upon a normal range of object distances and a substantially shorter macro range can be supplemented by a negative component of one or more lenses whose focal length is less than the depth of the macro range and which forms a virtual image of a nearby object on the object plane of the objective when the latter is adjusted to a predetermined clasp position. A correlating linkage between a seat for the supplemental component and a control member designed to establish the clasp position serves to index the control member in that position or to prevent the emplacement of the supplemental component if the objective is in a different position.

U.S. Pat. No. 5,146,256

Inventor: Peter A. Frosig, et al.

Issued: Sep. 8, 1992

A close-up attachment, including a close-up accessory lens and a corresponding finder lens, is attached to a single use camera by means of a plug-like insert, which is manually positioned in an open viewfinder tunnel of the camera.

U.S. Pat. No. 5,571,353

Inventor: Minoru Tanaka

Issued: May 12, 1998

A small and light TV camera extender switching apparatus which is capable of switching two extenders having different magnifications. A first extender and a second extender are supported by the same support shaft so as to be rotatable independently of each other. The first extender and the second extender are rotated by operating the first operating lever and the second operating lever, respectively, via gear trains, so that either extender is moved from the resting position outside of an imaging optical path to a working position in the imaging optical path. A stopper mechanism which is capable of adjusting a retaining position is disposed on the lens frame or in the case so as to adjust the retaining positions of each extender at the resting position and the working position.

U.S. Pat. No. 5,878,285

Inventor: Peter J. Wilk et al.

Issued: Mar. 2, 1999

A camera device having photosensitive film, a frame connected to the film for holding the film fixed in a first plane, and a plurality of lenses of several predetermined focusing powers mounted to the frame and disposed in a second plane spaced from and parallel to the plane of the film. A shutter assembly is mounted to the frame for enabling light transmission selectively through the lenses and onto the film. The shutter assembly is actuated by shutter activation componentry mounted to the frame and operatively connected to the shutter assembly. A fresnel lens and a Fresnel reflector are mounted to the frame and disposed on opposite sides of a light source for providing artificial illumination for the camera. Each lens is associated with a respective viewfinder and a respective camera exposure indicator. The camera is designed for storage and transport in a wallet or billfold.

U.S. Pat. No. 5,895,134

Inventor: Jay D. Freeman, et al.

Issued: Apr. 20, 1999

A single use camera is preloaded with a roll of magnetically coated film with defined image frames. The camera has an exposure system for selectively exposing an image frame of the film in one of a plurality of image formats. The camera also includes a manually actuated mechanism coupled to a mounted permanent magnet. The magnet is movable to record a magnetic mark on the magnetically coated film at a predetermined location relative to an exposed image frame. The location of the mark is indicative of the image format of the exposed image frame.

While these Multi-lens camera devices designed for effecting the filmed image may be suitable for the purposes for which they were designed, they would not be as suitable for the purposes of the present invention, as hereinafter described.

SUMMARY OF THE PRESENT INVENTION

The present invention discloses a rotatable disc which is pivotally mounted onto the front of a camera housing, which may be a disposable camera, having a plurality of user selectable rotatable lens mounted thereon each having a plurality of facets. Each lens also has a visual symbol associated therewith for easy recognition by the user. Rotation of the disc and lens about its central pivot creates numerous artistic accentuations to the photographs of the user.

A primary object of the present invention is to provide a plurality of multi-faceted lenses which can be positioned between the scene, object, or subject and the photographic medium whereby the lens element selected will render the scene, object, or subject in a predictable artistic manner determined by the user and the lens element selected.

Another object of the present invention is to provide a plurality of multi-faceted lenses which can be selectively positioned in a camera's image optical path for effecting multiple scene images on a single photographic medium frame.

Yet another object of the present invention is to provide a disc lens member having a plurality of peripherally placed rotatable multi-faceted lens elements placed thereon forming an integral part thereof.

Still yet another object of the present invention is to provide a mountable rotatable disc lens member which can be mounted on a camera providing a plurality of multi-faceted lens elements that can be selectively positioned between the camera's fixed focal lens and a scene, object or subject to effect the photographic image in an artistic manner as defined by the user and the lens element selected.

Another object of the present invention is to provide a disposable camera having a plurality of special effect lenses arrayed on a rotatable disc lens member for selectively effecting the film frame image in a predetermined predictable manner based on the special effect lens selected.

Yet another object of the present invention is to provide a disposable camera having a primary lens to focus an image of a primary scene on a photographic medium and a secondary disc lens member having a plurality of special effect lens for effecting the primary scene on a single photographic medium frame with multiple images.

Additional objects of the present invention will appear as the description proceeds.

The present invention overcomes the shortcomings of the prior art by providing a plurality of camera lenses each having a plurality of facets whereby a scene, object, or subject will be rendered on a photographic medium in an artistic manner has defined by the user of said lenses.

Additionally the multi-faceted lens elements can be mounted onto a disc wherein each lens element is rotatable and the disc can be rotatably mounted on a camera body providing the user with means for selectively positioning a lens element in the image optical path and effecting a photographic image of the subject in an artistic manner as defined by the user of said camera.

A further additional element is provided in the form of a disposable camera having the lens selector dial mounted thereon providing said camera with means for selectively rendering a scene, object or subject in an artistic manner as defined by the user of the disposable camera. The disposable camera being a light-tight housing having a photographic medium contained therein for recording a scene, object or subject through a user controlled aperture having a fixed focal lens and having the selectively rotatable disc lens selector member.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

Also shown is a graphical symbol imprinted near the lens element depicting the type of multi-faceted lens element. Each of the lens elements can additionally be rotated by the user to vary the image in an artistic manner which will be recorded on the film frame photographic medium.

Figure 2:
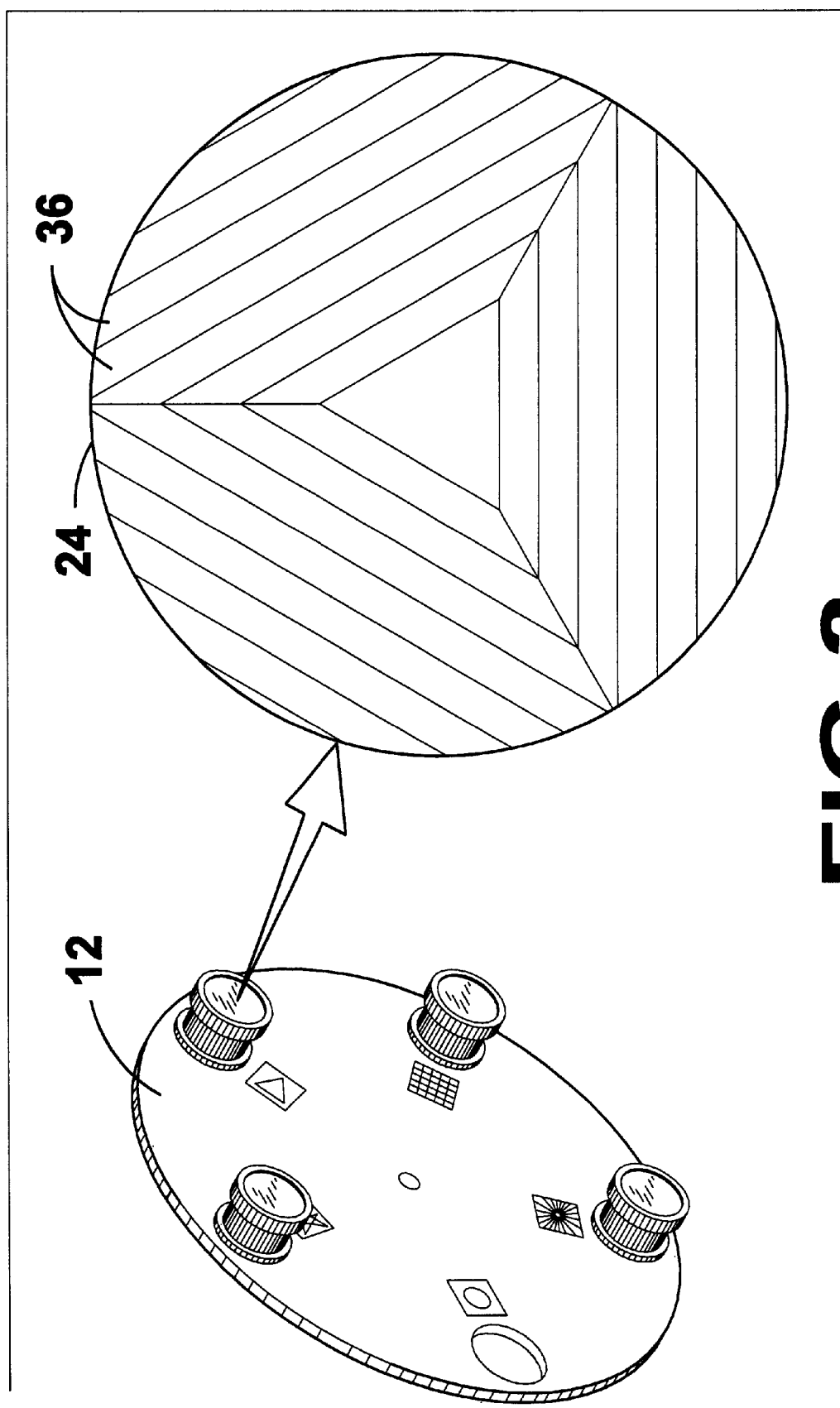

FIG. 2 is a perspective view of the lens select dial having a plurality of multi-faceted lenses mounted thereon. Each of the multi-faceted lens elements can be selectively rotated either clockwise or counterclockwise by the user to artistically effect the image to be recorded on the photographic medium. Also shown is an enlarged view of the multi-faceted lens element labeled triangular lens showing the facets of said lens element.

Figure 3:
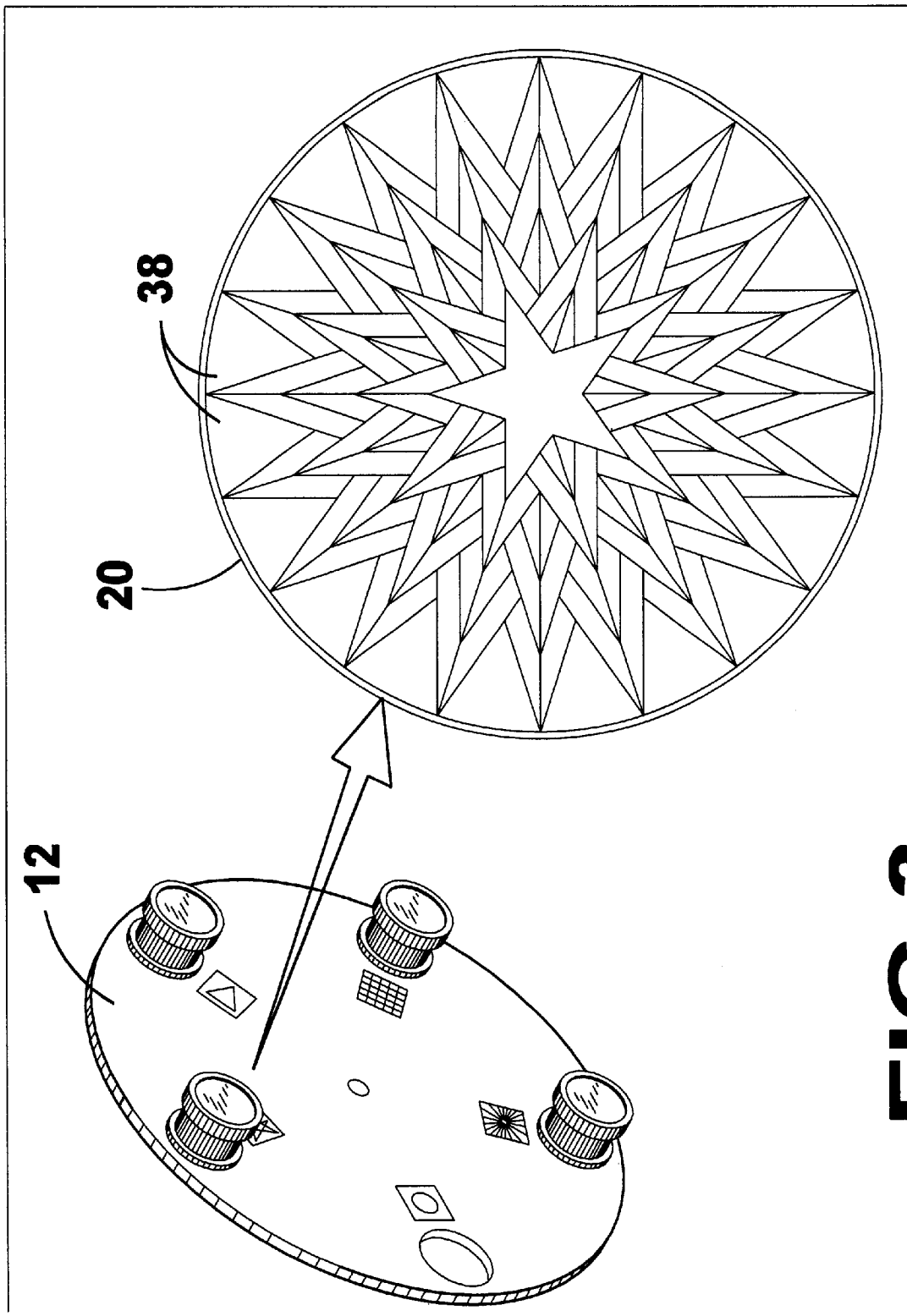

FIG. 3 is a perspective view of the lens select dial having a plurality of multi-faceted lenses mounted thereon. Each of the multi-faceted lens elements can be selectively rotated either clockwise or counterclockwise by the user to artistically effect the image to be recorded on the photographic medium. Also shown is an enlarged view of the multi-faceted lens element labeled star lens showing the facets of said lens element.

Figure 4:
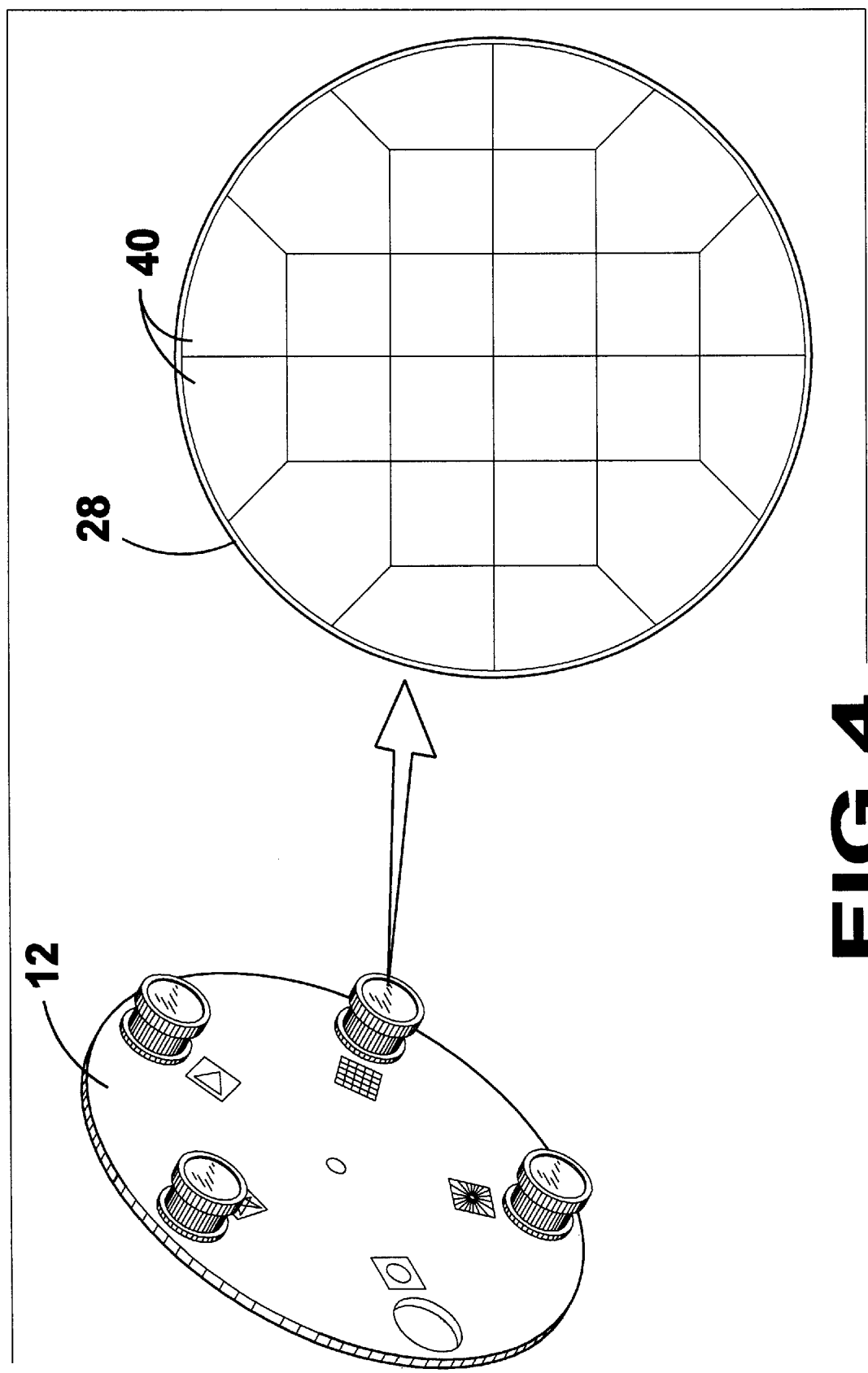

FIG. 4 is a perspective view of the lens select dial having a plurality of multi-faceted lenses mounted thereon. Each of the multi-faceted lens elements can be selectively rotated either clockwise or counterclockwise by the user to artistically effect the image to be recorded on the photographic medium. Also shown is an enlarged view of the multi-faceted lens element labeled square lens showing the facets of said lens element.

Figure 5:
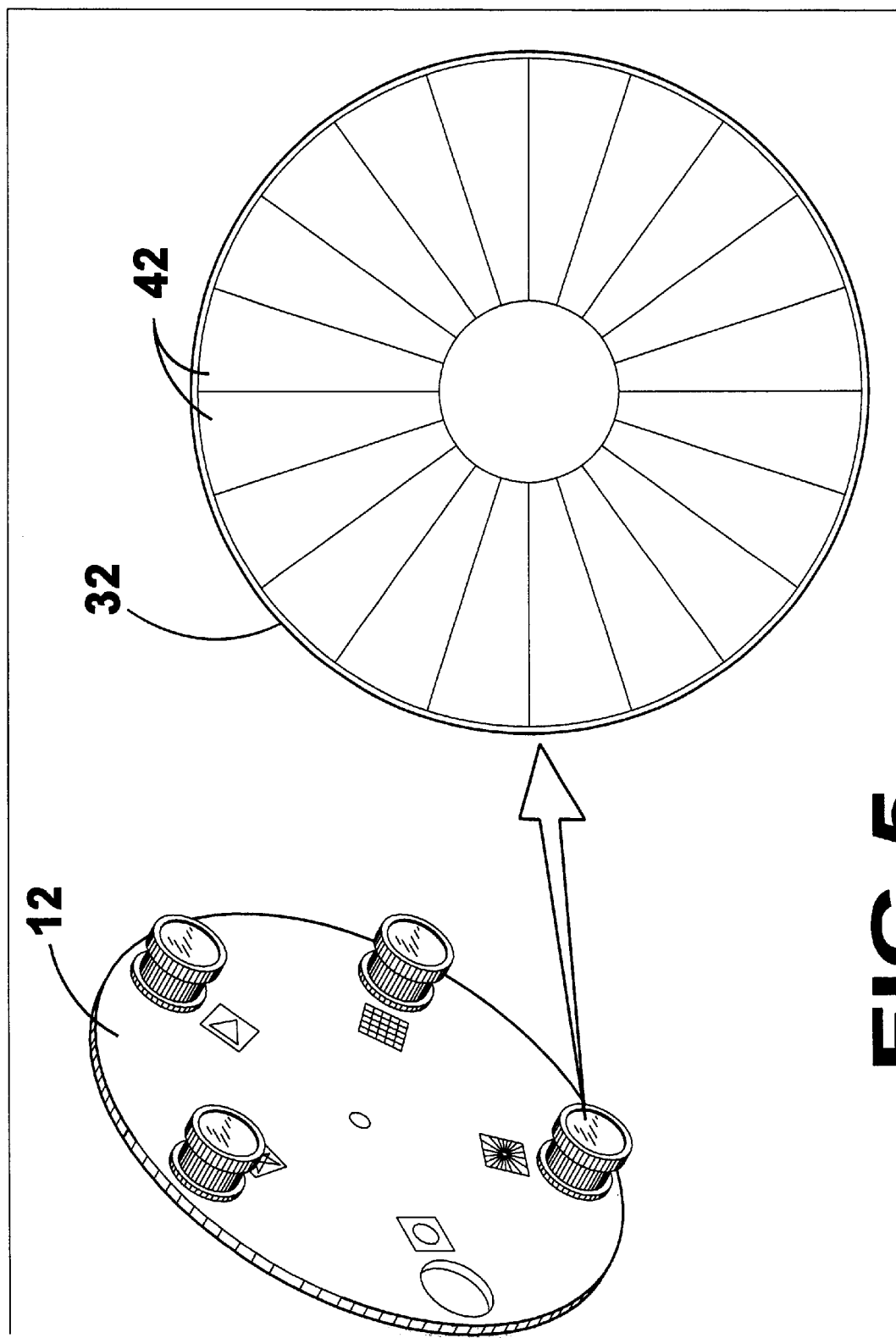

FIG. 5 is a perspective view of the lens select dial having a plurality of multi-faceted lenses mounted thereon. Each of the multi-faceted lens elements can be selectively rotated either clockwise or counterclockwise by the user to artistically effect the image to be recorded on the photographic medium. Also shown is an enlarged view of the multi-faceted lens element labeled radial lens showing the facets of said lens element.

Figure 6:
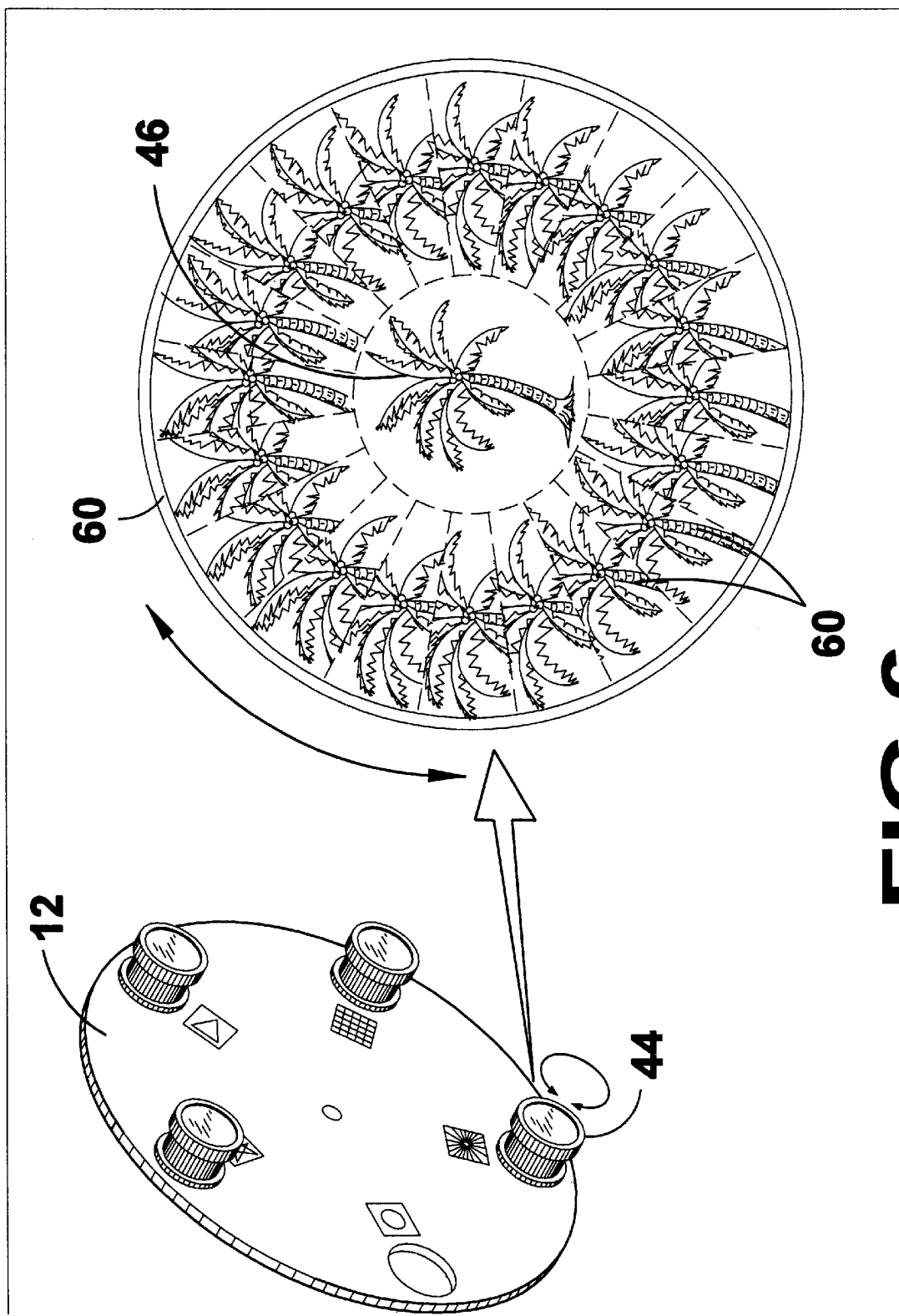

FIG. 6 is a perspective view of the lens select dial having a plurality of multi-faceted lenses mounted thereon. Each of the multi-faceted lens elements can be selectively rotated either clockwise or counterclockwise by the user to artistically effect the image to be recorded on the photographic medium. Also shown is an illustration of an image as viewed through the triangular lens element. The image recorded can be varied by rotating the lens element while it is within the camera/photographic medium image optical path. Also the image within each facet can be a part of an object, scene or subject by varying the distance to the subject.

Figure 7:
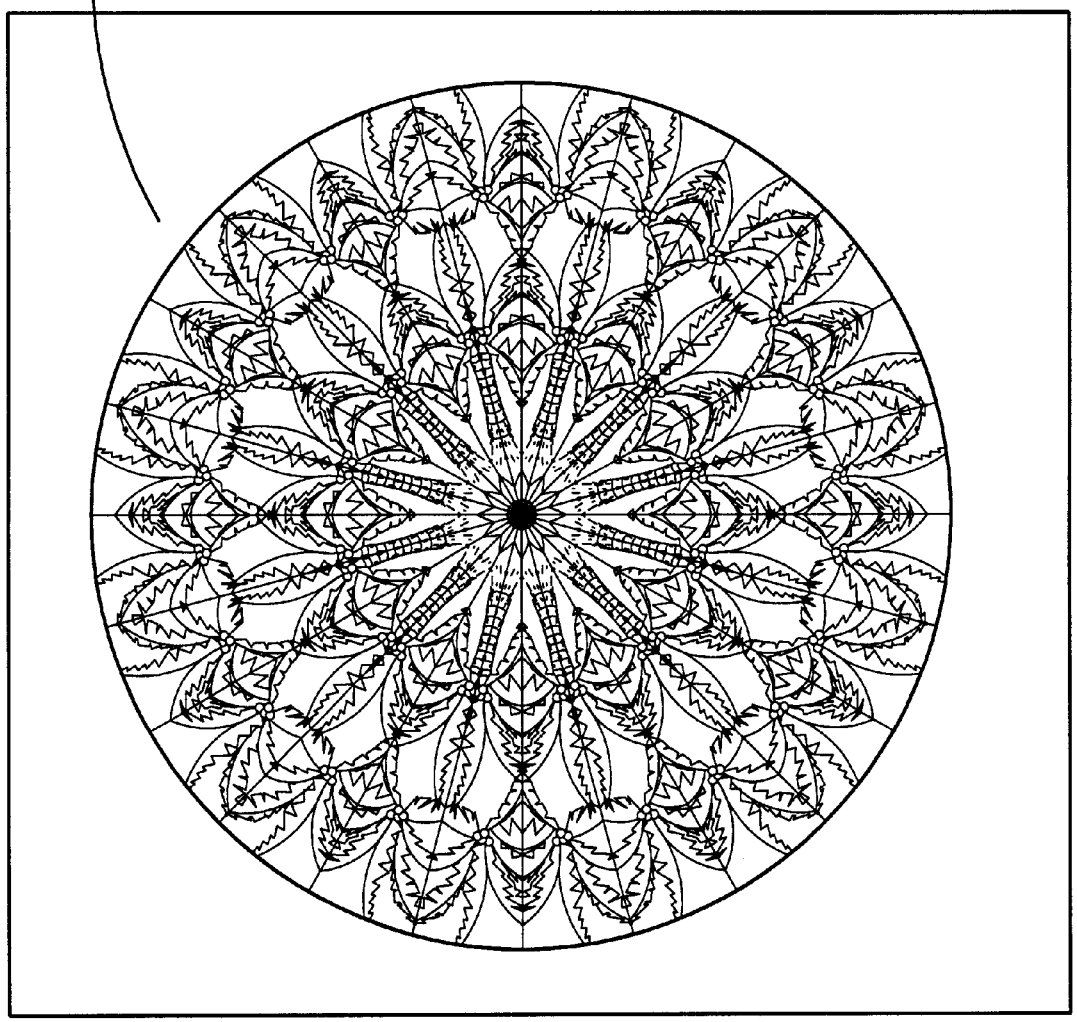

FIG. 7 is an illustration of a photographic image which can be achieved by a lens element having a plurality of facets radiating from a central lens focal point.

Figure 8:
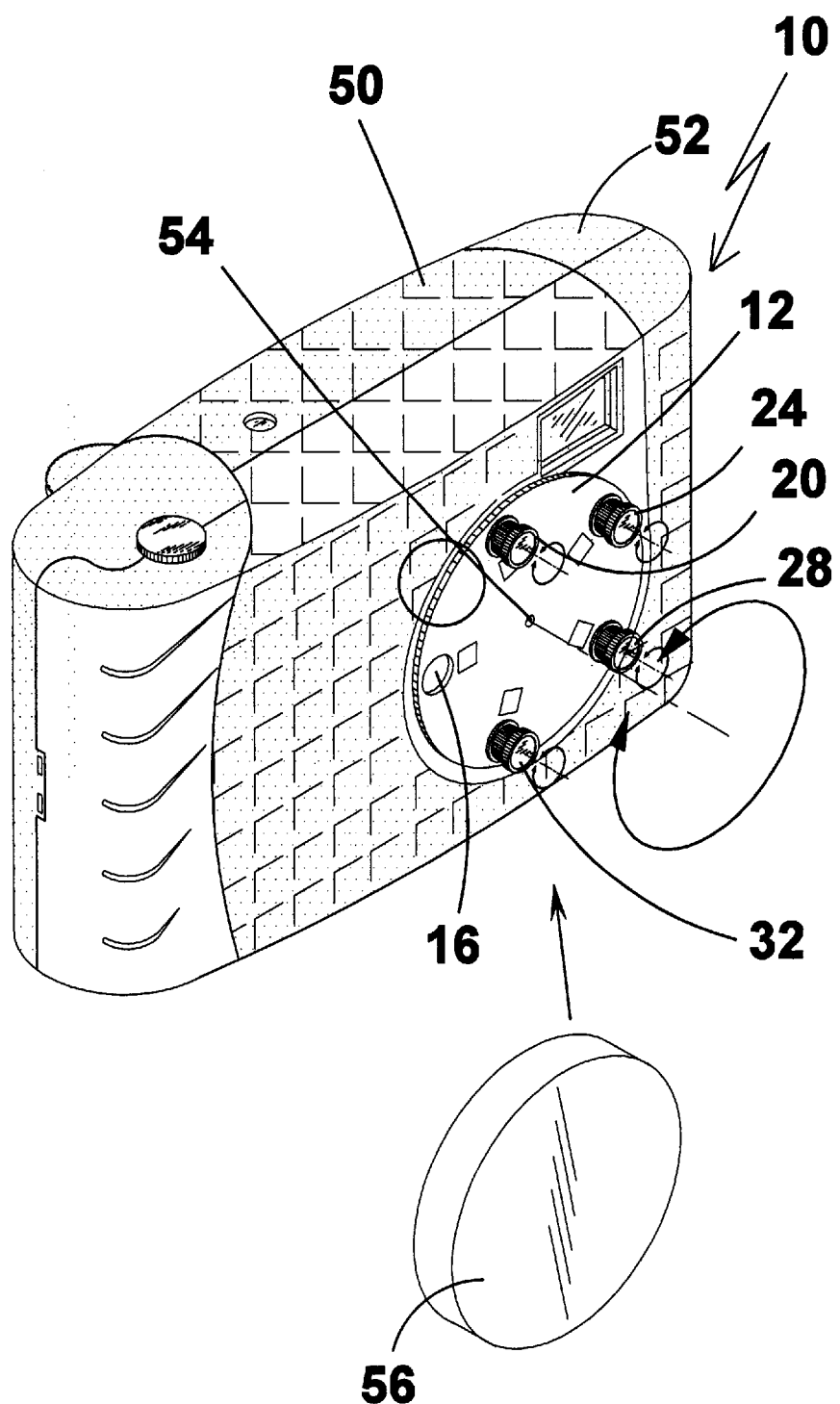

FIG. 8 is a perspective view of the present invention having an additional element. Shown is a disposable camera having a light-tight housing having a photographic medium, not shown, contained therein for recording a scene, object or subject through a user controlled aperture having a fixed focal lens and having a selectively rotatable disc lens member.

The selectively rotatable disc lens member has a plurality of special effect lenses arrayed on the disc member which can be individually positioned in the image optical path to effect the film frame image in an artistic manner defined by the user and the multi-faceted lens element selected.

In addition, each lens element contained on the rotatable disc lens member can be selectively rotated either clockwise or counterclockwise by the user to artistically effect the image to be recorded on the photographic medium.

Figure 9:
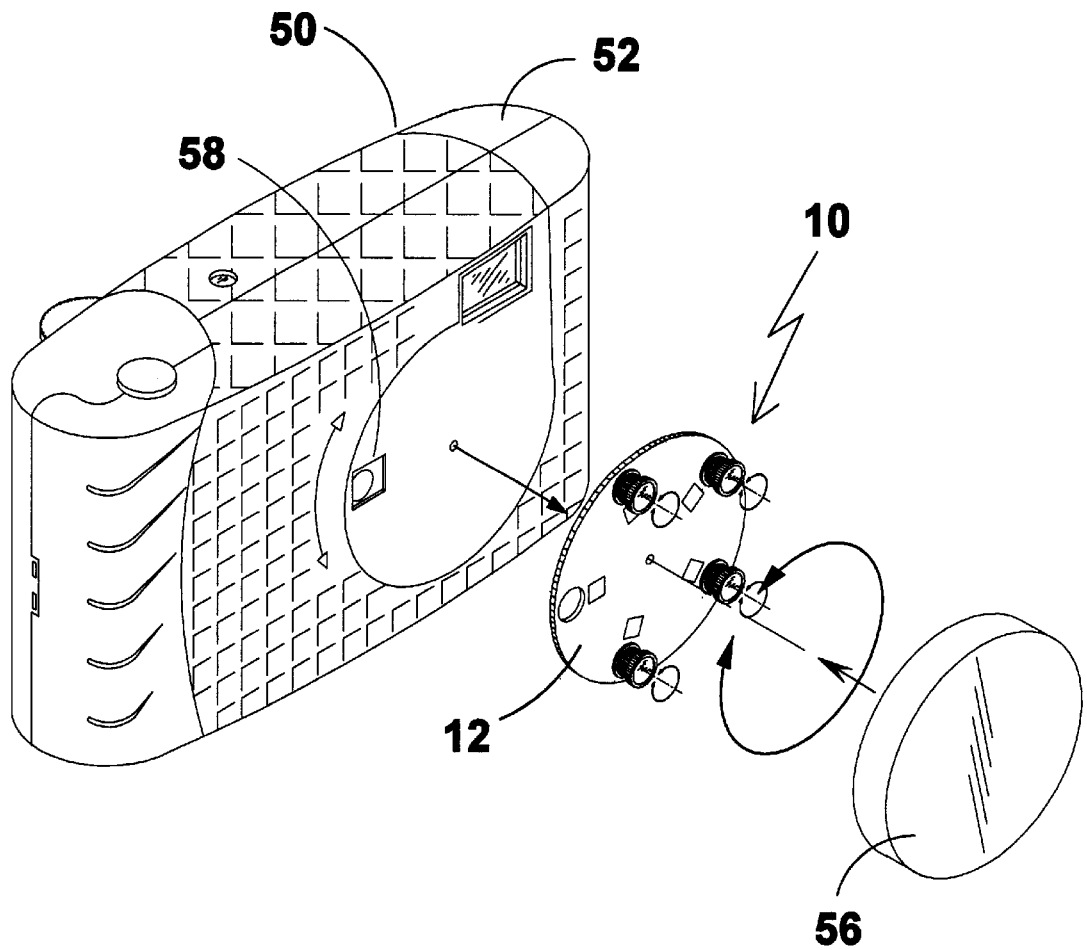

FIG. 9 is an exploded view of the present invention having an additional element in the form of a disposable camera. The disposable camera is a light-tight housing having a photographic medium, not shown, contained therein for recording a scene, object or subject through a user controlled aperture having a fixed focal lens and having a selectively rotatable disc lens member.

The disc member having a plurality of lens elements mounted thereon is mounted to the disposable camera so that each of the lens elements can be individually positioned in the camera's image optical path to effect the film frame image in an artistic manner defined by the user and the multi-faceted lens element selected.

In addition, each lens element contained on the rotatable disc lens member can be selectively rotated either clockwise or counterclockwise by the user to artistically effect the image to be recorded on the photographic medium.

LIST OF REFERENCE NUMERALS

With regard to reference numerals used, the following numbering is used throughout the drawings.

10 present invention
12 rotatable disc
14 lenses
16 clear lens
18 clear lens symbol
20 star lens
22 star lens symbol
24 triangular lens
26 triangular lens symbol
28 square lens
30 square lens symbol
32 radial lens
34 radial lens symbol
36 triangular facets
38 star facets
40 square facets
42 radial facets
44 direction arrow
46 central image
48 kaleidoscopic lens
50 disposable camera
52 housing
54 pivot
56 lens cover
58 fixed lens
60 radial lens image

DESCRIPTION OF THE PREFERRED EMBODIMENT(S)

In order that the invention may be more fully understood, it will now be described by way of example, with reference to the accompanying drawings in which FIGS. 1 through 9 illustrate the present invention being a multi-lens member for a disposable camera.

Figure 1:
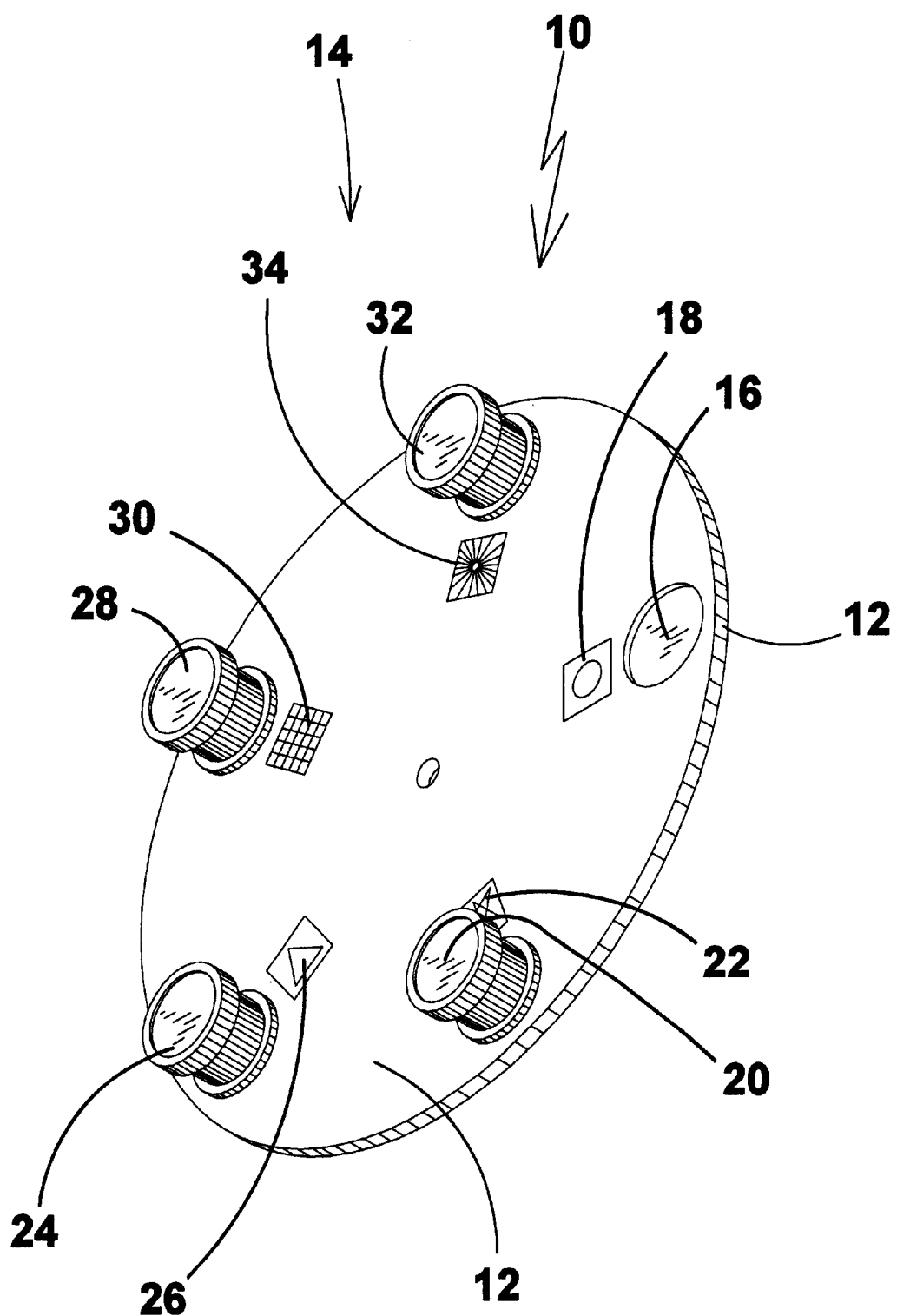
FIG. 1 is a perspective view of the rotatable disc lens member of the present invention having a plurality of multi-faceted special effect lenses peripherally arrayed on a disc. Each of the multi-faceted lens elements will effect a film frame image in an artistic manner as defined by the user and the lens element selected by placing the lens element in a camera's image optical path.

Turning to FIG. 1, shown therein is a perspective view of the rotatable disc 12 member of the present invention 10 having a plurality of multi-faceted special effect lenses 14 peripherally arrayed on the disc 12. Each of the multi-faceted lens elements will effect a film frame image in an artistic manner as defined by the user and the lens element selected by placing the lens element in the camera's image optical path. Shown is a clear lens 16 and associated visual symbol 18, star lens 20 and symbol 22, triangular lens 24 and symbol 26, square lens 28 and symbol 30, and radial lens 32 and symbol 34.

Shown is a graphical symbol, e.g., 18, imprinted near the lens element, e.g., 16, depicting the type of multi-faceted lens element Each of the lens elements can additionally be rotated by the user to vary the image in an artistic manner which will be recorded on the film frame photographic medium inside the camera.

Turning to FIG. 2, shown therein is a perspective view of the lens select dial 12 having a plurality of multi-faceted lenses mounted thereon. Each of the multi-faceted lens elements can be selectively rotated either clockwise or counterclockwise by the user to artistically effect the image to be recorded on the photographic medium. Also shown is an enlarged view of the multi-faceted lens element labeled triangular lens 24 showing the facets 36 of the lens element.

Turning to FIG. 3, shown therein is a perspective view of the lens select dial 12 having a plurality of multi-faceted lenses mounted thereon. Each of the multi-faceted lens elements can be selectively rotated either clockwise or counterclockwise by the user to artistically effect the image to be recorded on the photographic medium. Also shown is an enlarged view of the multi-faceted lens element labeled star lens 20 showing the facets 38 of the lens element.

Turning to FIG. 4, shown therein is a perspective view of the lens select dial 12 having a plurality of multi-faceted lenses mounted thereon. Each of the multi-faceted lens elements can be selectively rotated either clockwise or counterclockwise by the user to artistically effect the image to be recorded on the photographic medium. Also shown is an enlarged view of the multi-faceted lens element labeled square lens 28 showing the facets 40 of the lens element.

Turning to FIG. 5, shown therein is a perspective view of the lens select dial 12 having a plurality of multi-faceted lenses mounted thereon. Each of the multi-faceted lens elements can be selectively rotated either clockwise or counterclockwise by the user to artistically effect the image to be recorded on the photographic medium. Also shown is an enlarged view of the multi-faceted lens element labeled radial lens 32 showing the facets 42 of the lens element.

Turning to FIG. 6, shown therein is a perspective view of the lens select dial 12 having a plurality of multi-faceted lenses mounted thereon. Each of the multi-faceted lens elements can be selectively rotated either clockwise or counterclockwise by the user as shown by direction arrow 44 to artistically effect the image to be recorded on the photographic medium. Also shown is an illustration of an image 60 as viewed through the radial lens element. The image recorded can be varied by rotating the lens element while it is within the camera/photographic medium image optical path. Also the image within each facet can be a part of an object, scene or subject by varying the distance to the subject. Also shown is a central image 46.

Turning to FIG. 7, shown therein is an illustration of a photographic image which can be achieved by a lens element having a plurality of facets radiating from a central lens focal point which can create an image using kaleidoscopic lens 48.

Turning to FIG. 8, shown therein is a perspective view of the present invention 10 having an additional element. Shown is a disposable camera 50 having a light-tight housing 52 having a photographic medium, not shown, contained therein for recording a scene, object or subject through a user controlled aperture having a fixed focal lens and having a selectively rotatable disc lens member 12.

The selectively rotatable disc lens member 12 has a plurality of special effect lenses 16, 20, 24, 28, 32 arrayed on the disc member 12 which can be individually positioned in the image optical path to effect the film frame image in an artistic manner defined by the user and the multi-faceted lens element selected.

In addition, each lens element contained on the rotatable disc lens member can be selectively rotated either clockwise or counterclockwise about pivot 54 by the user to artistically effect the image to be recorded on the photographic medium. Also shown is lens cover 56.

Turning to FIG. 9, shown therein is an exploded view of the present invention 10 having an additional element in the form of a disposable camera 50. The disposable camera has a light-tight housing 52 having a photographic medium, not shown, contained therein for recording a scene, object or subject through a user controlled aperture having a fixed focal lens 58 and having a selectively rotatable disc lens member 12.

The disc member 12 has a plurality of lens elements mounted thereon to the disposable camera so that each of the lens elements can be individually positioned in the camera's image optical path to effect the film frame image in an artistic manner defined by the user and the multi-faceted lens element selected.

In addition, each lens element contained on the rotatable disc lens member 12 can be selectively rotated either clockwise or counterclockwise by the user to artistically effect the image to be recorded on the photographic medium. Also shown is lens cover 56.

I claim:

1. An apparatus for attachment of a lens to a camera, comprising:

a) a camera having a front and a rear side, said camera having a light-tight housing and a primary lens positioned on said front side;

b) a rotatable disc pivotally mounted onto said front of said camera; and, c) means comprising a plurality of rotatable lens mounted in a spaced apart relationship about said rotatable disc, each said rotatable lens having facets forming a different pattern through which the primary lens is focused.

2. The apparatus of claim 1, wherein said facets are star shaped.

3. The apparatus of claim 1, wherein said facets are triangular shaped.

4. The apparatus of claim 1, wherein said facets are square shaped.

5. The apparatus of claim 1, wherein said facets are radial shaped.

6. The apparatus of claim 1, wherein said facets are kaleidoscopic shaped.

7. The apparatus of claim 1, said rotatable disc having a central aperture therein for use in being pivotally mounted.

* * * * *